US006597074B2

United States Patent
Tsujikado et al.

(10) Patent No.: US 6,597,074 B2
(45) Date of Patent: Jul. 22, 2003

(54) BACKUP POWER-SOURCE MODULE, BACKUP POWER-SOURCE APPARATUS, AND COMPUTER

(75) Inventors: Seiji Tsujikado, Isehara (JP); Takuya Kubo, Kouza-gun (JP); Hisato Matsuo, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/681,506

(22) Filed: Apr. 18, 2001

(65) Prior Publication Data

US 2001/0030469 A1 Oct. 18, 2001

(30) Foreign Application Priority Data

Apr. 18, 2000 (JP) ......................................... 2000-116434

(51) Int. Cl.[7] .................................................. H02J 9/00
(52) U.S. Cl. .............................. 307/66; 307/64; 307/80; 307/85; 307/86; 307/43
(58) Field of Search ............................. 307/66, 64, 80, 307/85, 86, 43

(56) References Cited

U.S. PATENT DOCUMENTS

| 4,611,289 A | * | 9/1986 | Coppola | ........................ 364/492 |
| 5,923,099 A | * | 7/1999 | Bilir | ............................. 307/64 |
| 6,274,949 B1 | * | 8/2001 | Lioux et al. | ................... 307/64 |

FOREIGN PATENT DOCUMENTS

JP  8-251837  3/1995  ............. H02J/9/06

* cited by examiner

*Primary Examiner*—Brian Sircus
*Assistant Examiner*—Robert L. Deberadinis
(74) *Attorney, Agent, or Firm*—Derek S Jennings

(57) ABSTRACT

A backup power-source module that controls a backup power source for supplying power from a battery charged by an AC input to an electronic device when the AC input is cut off. The backup power-source module includes a selection which generates a selection signal for selecting power supplied by a battery when the electronic device is kept in an electrified state until the electronic device is shifted to a power cutoff state and there is no AC input. I.E., the selection signal causes the power supplied by the battery to be selected only when the electronic device is kept in a power cutoff state and there is no AC input.

10 Claims, 5 Drawing Sheets

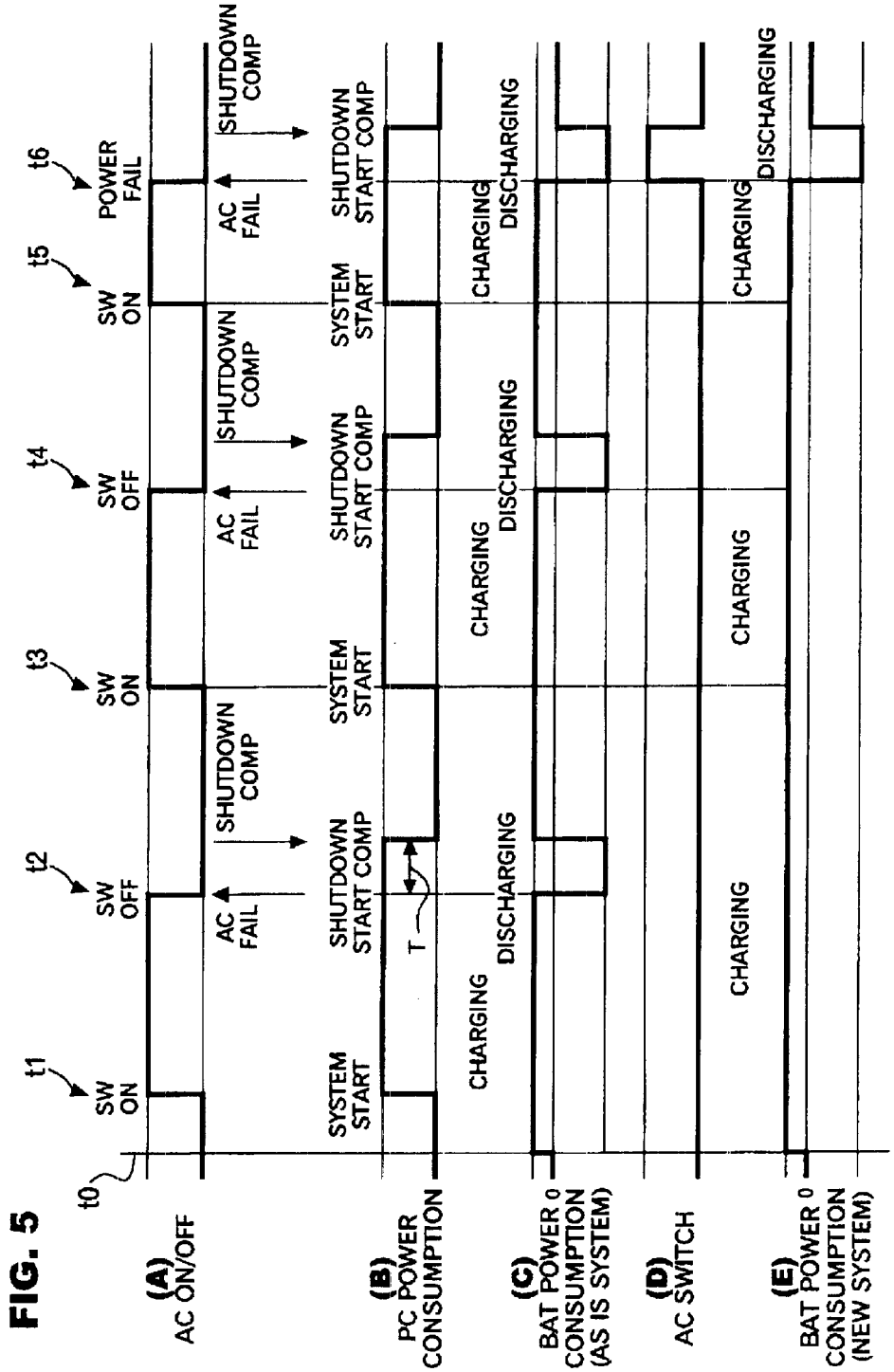

BACKUP POWER-SOURCE MODULE, BACKUP POWER-SOURCE APPARATUS, AND COMPUTER

BACKGROUND OF INVENTION

1. Field of the Invention

The present invention relates to a backup power-source module, a backup power-source apparatus, and a computer, and more particularly to a backup power-source module for controlling a backup power source for supplying the power of a battery charged by AC input to an electronic device when the AC input is cut off, a backup power-source apparatus provided with the backup power-source module, and a computer using the power supplied from a battery.

2. Background Art

A personal computer (PC) has been frequently provided with a chip (hereinafter referred to as "core chip") on which a logic (hereinafter referred to as "state machine") for controlling power-source states of the PC, including internal register operations for storing the current power-source state of the PC is mounted, wherein the power-source states of the PC including on/off of the power source are controlled by the state machine of the core chip. An interface (I/F) with the state machine of the core chip is standardized. In a PC conforming to ACPI (Advanced Configuration and Power Interface), an I/F with a state machine is controlled by an operating system (OS). The power source of the PC is turned off by the OS which commands a power-source section through the state machine to turn off power after performing various types of power-off sequences.

Therefore, in the PC, a power source is not directly turned on or off by switching on/off a power switch in general but a power-on or power-off command is generated by the OS or by switching on/off the power switch to perform startup processing including power-on or termination processing including power-off.

However, a power source for supplying power to a PC may be cut off or may become unstable due to power-source troubles caused by various reasons which include, for example, artificial faults, influences of peripheral power-source conditions, and natural disasters. The artificial faults include mishandling of a power switch, accidental detachment of an AC plug, breaker action due to excessive current of a device, and leak breaker action. The influences of peripheral power-source conditions include drop of a power-source voltage and power-source noises. The natural disasters include power failure due to a thunderbolt.

When such a power-source trouble occurs, supply of power to a PC is unexpectedly cut off and a part of the software such as an OS or an application program might be corrupted if a power-source state is controlled by such software. If software, particularly an OS, or data and/or file managed by the OS is corrupted, it would be difficult to restart a PC and it may take a lot of time to restore the PC. Therefore, to back up power supply during a power failure, the number of PCs connected with an uninterruptible power system (UPS) is increasing.

The UPS has the function for automatically shifting a PC to a power cutoff state when a power failure occurs.

When a UPS is used and a power-supply source is turned on/off due to detachment of an AC plug or on/off action of a power switch, a battery built in the UPS is used and thus, the battery starts discharging. Therefore, when the battery built in the UPS is used, frequency of switching between charging and discharging of the battery is increased due to detachment of the AC plug or on/off action of the power switch, causing the lifetime of the battery to be shortened. Therefore, a technique has been proposed which stops discharging of a battery by detecting detachment of an AC plug from an AC outlet or detecting activation of a remote switch, as described in Published Unexamined Japanese Patent Application No. 8-251837.

However, a predetermined time interval is required between the switching off of the power switch and power-source cutoff when the PC performs power-cutoff processing after a power-off command is generated by the OS or by the switching off of the power switch and the termination processing is performed. The power-cutoff processing may not be smoothly performed by merely stopping discharging of the battery after the switching off of the power switch because, during this predetermine time interval, it is necessary to continuously supply power to the PC.

Moreover, when the battery in the UPS is used after the switching off of the power switch, frequency of switching between charging and discharging of the battery is increased so that the lifetime of the battery becomes shorter, as described above.

SUMMARY OF INVENTION

In view of the above, an object of the present invention is to provide a backup power-source module for backing up AC input without shortening the lifetime of a battery, a backup power-source apparatus provided with the module, and a computer using power supplied from the battery.

A feature of the present invention includes a backup power-source module that controls a backup power source for supplying power from a battery charged by an AC input to an electronic device when the AC input is cut off. The backup power-source module includes a selection which generates a selection signal for selecting power supplied by a battery when the electronic device is kept in an electrified state until the electronic device is shifted to a power cutoff state and there is no AC input. I.E., the selection signal causes the power supplied by the battery to be selected only when the electronic device is kept in a power cutoff state and there is no AC input.

Another feature of the present invention includes a backup power-source apparatus having a backup power-source module, a battery connected to the electronic device so that power can be supplied, a battery charger for charging the battery by the AC input, and a switch for switching power to be supplied to the electronic device between power from the AC input and power from the battery in accordance with the selection signal.

Still another feature of the present invention includes a computer having a function for backing up a power source by itself by incorporating the above described backup power-source apparatus into the computer.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIG. 5 is an illustration for explaining operations of the uninterruptible power system according to the embodiment.

DETAILED DESCRIPTION

Figure 1:
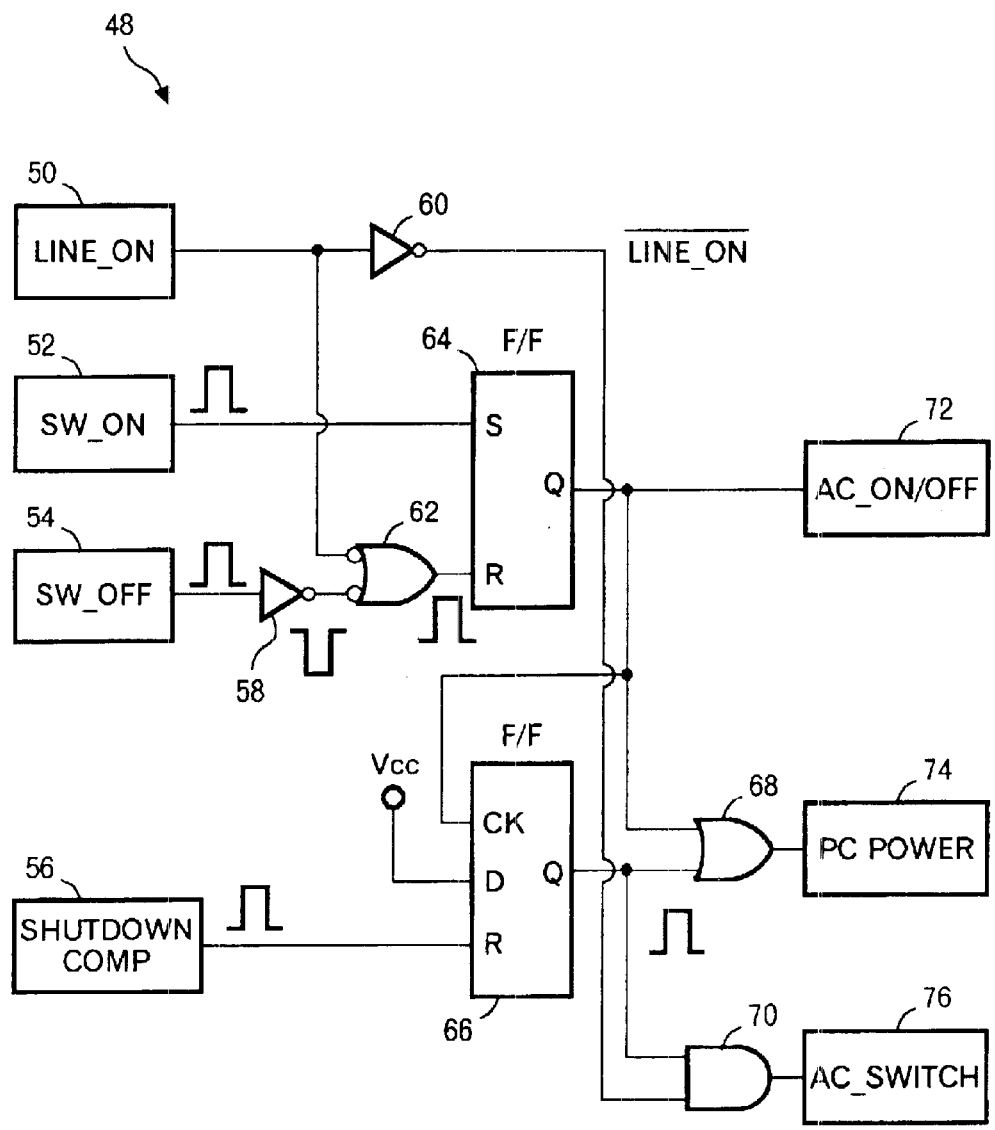
FIG. 1 is a schematic block diagram showing a configuration of an AC controller according to the embodiment of the present invention.

Some electronic devices such as computers, which are to be shifted to a power cutoff state require a certain period until a power source is actually cut off after cutoff of the power source is indicated. During this period, it is preferable to continue AC input to the electronic device in the electrified state, rather than supplying power from a battery serving as a backup power source for supplying power to the electronic device instead of the AC input. In the normal electrified state, if power supply is switched from the AC input to the battery, frequency of switching of the battery is increased to shorten its lifetime. In the present invention, however, the lifetime of the battery for backing up the AC input is not shortened because power supplied from the battery is selected only when the electronic device is in the electrified state requiring power and there is no AC input.

The above backup power-source module may be further provided with an indicator for outputting an indication signal indicating supply or cutoff of power to the electronic device. By this indication signal, the electronic device can shift to startup processing after power-on, or power-source cutoff processing under the control of the OS.

The above described selector includes a detector for detecting a signal showing that the electronic device has shifted to the power cutoff state, and the selection signal can be generated in accordance with the detection results of the detector and there is a no-input state for the AC input. The electronic device to be shifted to the power cutoff state such as a computer may output information showing that the device shifts to the power cutoff state, in accordance with a direction by the OS or a predetermined sequence. By detecting the information, it is possible to assuredly detect that the electronic device in the electrified state has shifted to the cutoff state, to supply power to the electronic device only for a proper period, and to reduce power consumption.

The selector includes a timer for measuring a predetermined time corresponding to the shift of the electronic device to the power cutoff state, and can generate the selection signal in accordance with the measurement result of the timer and the no-input state of the AC input. In the electronic device, such as a computer, to be shifted to the power cutoff state, it is possible to statistically calculate a time passing until shifting to the cutoff state under the electrified state in which supply of power is required, or such a time may be already known. In that case, by measuring a predetermined time corresponding to the shift of the electronic device to the power cutoff state, it is possible to detect that the electronic device has shifted to the power cutoff state without requiring any external signal input, to supply power to the electronic device only for a proper period, and to reduce power consumption.

The indicator can output an indication signal showing the supply or cutoff of power to the electronic device in accordance with the operation of a switch for indicating the supply or cutoff of power to the electronic device. The switch may be the one that outputs an indication signal from an indicator such as a power switch, and the electronic device can shift to the startup processing after power-on, or power-source cutoff processing under the control of the OS.

The electronic device may be a computer. Specifically, modern computers tend to perform startup processing after power-on and power cutoff processing, rather than immediately turning on or off a power source in accordance with the operation of a power switch. Thus, by using an apparatus including the backup power-source module for the computer performing the startup processing and power cutoff processing, it is possible for the computer to reduce power consumption without shortening the lifetime of the battery and to perform proper processing when computer power-off is directed.

Power is generally supplied to the electronic device such as a computer by the AC input. When a power failure occurs, power supply by the AC input is backed up by the backup power-source apparatus. The backup power-source apparatus includes a battery which is charged by a battery charger. As described above, when the selection signal shows selecting power supply by the battery, the switching means switches from power supply by the AC input to power supply by the battery.

In this way, power supply by the battery is selected only when the electronic device such as a computer is kept in the power cutoff state, there is no AC input, and power supply is required. Moreover, in the electrified state in which power supply is required, the AC input can supply power without switching to the battery. Therefore, the lifetime of the battery is not shortened.

The backup power-source apparatus is further provided with a rectifier for rectifying the AC input to supply power obtained by rectifying the AC input to the electronic device. The electronic device may require DC power, rather than directly connected to the AC input. This can be accomplished by further providing a rectifier for rectifying the AC input to supply power obtained by rectifying the AC input to the electronic device.

A computer conforming to, for example, the ACPI standard is preferable for the one according to the present invention.

Figure 2:
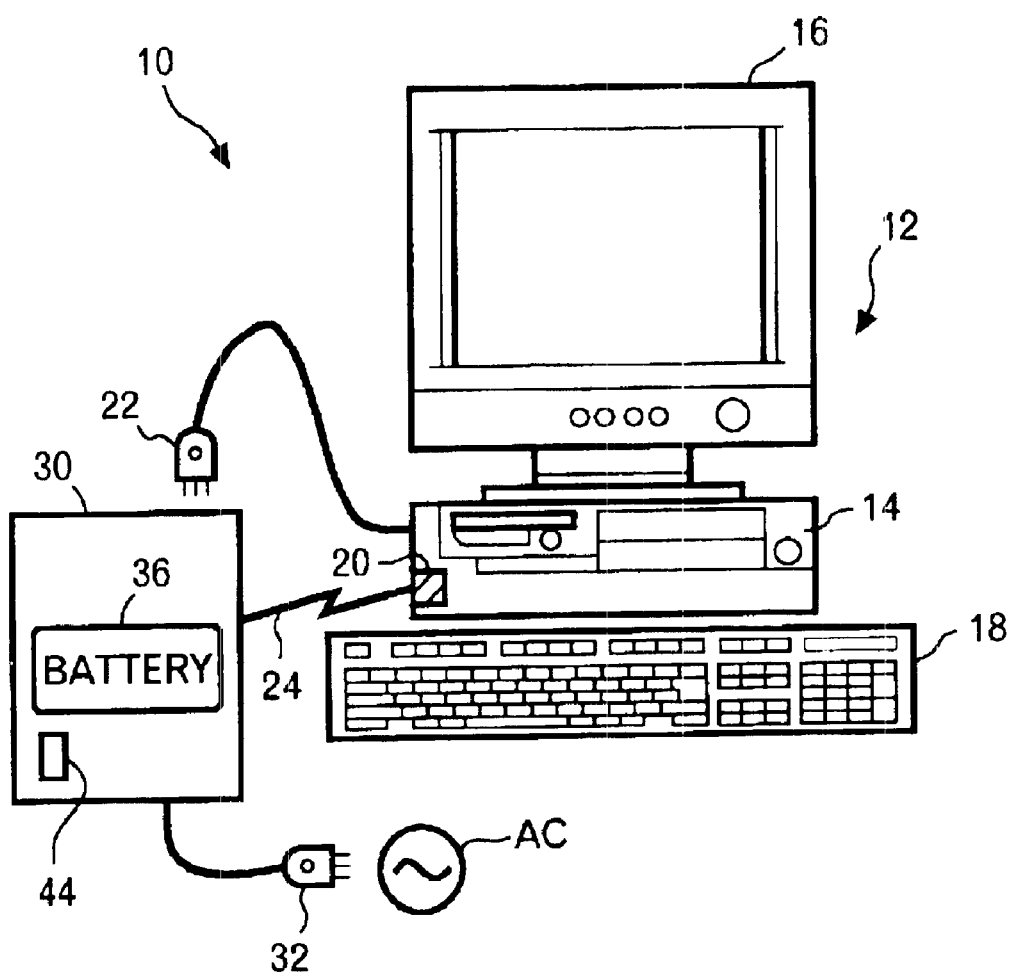
FIG. 2 is an outline view of a computer system including an uninterruptible power system and a desktop PC.

With reference to the accompanying drawings, the embodiments of the present invention will be described below in detail. FIG. 2 shows a schematic configuration of a computer system 10 comprising an uninterruptible power system (UPS) 30 suited to implement the present invention and a typical personal computer (PC) 12. An example of the PC 12 for implementing the present invention is a desktop PC which conforms to the OADG (PC Open Architecture Developer's Group) specification and runs "Windows 98", "Windows NT", or "Windows 2000" of Microsoft Corporation or "OS/2" of IBM Corporation as an operating system (OS).

Each section of the computer system 10 will be described below. Since the hardware configuration of the PC 12 is common and well known, only main functions thereof will be described below.

The PC 12 of the computer system 10 comprises of a computer body 14, a CRT 16, and a keyboard 18. The computer body 14 is provided with a CPU for executing various programs under the control of an OS. The CPU may be "Pentium", "MMX Technology Pentium", or "Pentium Pro" made by Intel, "Power PC" made by IBM, or any other CPU made by, for example, AMD. The CPU is interconnected with various hardware components through an FS (Front Side) bus which is a processor bus directly connected to the external pins of the CPU, a PCI (Peripheral Component Interconnect) bus serving as a high speed I/O bus, and an ISA (Industry Standard Architecture) bus serving as a low speed I/O bus. Another hardware component is a communication interface 20 conforming to the RS-232C communication protocol for communicating with other apparatus.

Other hardware components include external storages such as a hard disk drive (HDD) and a CD-ROM drive. Alternatively, a device of a different type such as a DVD (Digital Video Disk or Digital Versatile Disk) drive may be included instead of the CD-ROM drive. Furthermore, the PC 12 may be provided with a USB port which is connected to, for example, a USB connector provided on a sidewall of the PC 12.

The computer body 14 has an AC plug 22 for receiving power which is connected to a UPS 30. The UPS 30 is provided with an AC plug 32 for connecting to a commercial power source AC. Thereby, power is supplied to the PC 12 from the commercial power source AC or a battery 36 built in the UPS 30 (details will be described later). The communication interface 20 of the computer body 14 of the PC 12 is connected with the UPS 30 by a communication cable 24 for transmitting and receiving various signals. The UPS 30 is also provided with a power-source switch 44.

Figure 3:
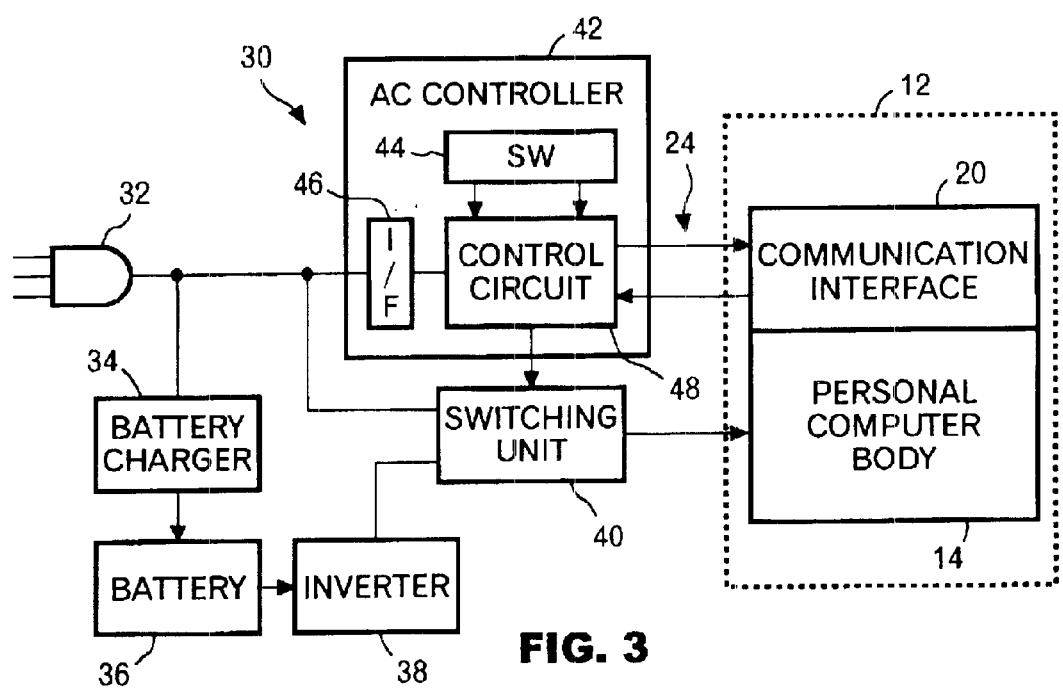
FIG. 3 is a block diagram showing a schematic configuration of the uninterruptible power system according to the embodiment.

As shown in FIG. 3, the UPS 30 is composed of an AC plug 32, a battery charger 34, a battery 36, an inverter 38, a switching unit 40, and an AC controller 42. The AC plug 32 is connected to the battery charger 34, switching unit 40, and AC controller 42. The battery charger 34 is connected to the battery 36 to charge the battery 36 from the commercial power source AC. The battery 36 is connected to one input of the switching unit 40 through the inverter 38. The other input of the switching unit 40 is connected to the AC plug 32.

The AC controller 42 includes a switch 44, an interface 46, and a control circuit 48. The AC plug 32 is connected to the interface 46 of the AC controller 42. The interface 46 is configured so as to output a high-level signal when the AC plug 32 is connected to the commercial power source AC and commercial power is supplied to the UPS 30, and to output a low-level signal when commercial power is not supplied to the UPS 30. The output of the interface 46 is connected to the control circuit 48 to be described later.

The control circuit 48 is connected to the switch 44 and also to the communication interface 20 included in the computer body 14 by the communication cable 24. The switch 44 indicates power-on/off. In this embodiment, the switch 44 outputs a high-level pulse signal when it is depressed.

As shown in FIG. 1, the control circuit 48 is provided with a terminal 50 connected to the output of the interface 46 to receive a signal (LINE_ON) showing a power supply state from the commercial power source AC, a terminal 52 receiving an ON signal (SW_ON) at power-on time of the switch 44, a terminal 54 receiving an OFF signal (SW_OFF) at power-off time, and a terminal 56 receiving a shutdown signal (Shutdown COMP) from the communication interface 20, as input terminals.

The terminal 50 to which the signal (LINE_ON) is input is connected to one input of a NOR circuit 62 having the other input connected to the terminal 54 to which an OFF signal (SW_OFF) is input through the inverter 58. The terminal 52 to which an ON signal (SW_ON) is input is connected to the input (S) of a flip-flop circuit 64 having the reset input (R) connected to the output of the NOR circuit 62. The output (Q) of the flip-flop circuit 64 is connected to a terminal 72 serving as an output terminal for outputting a signal (AC_ON/OFF). The signal (AC_ON/OFF) output from the terminal 72 shows that power-on or power-off is indicated by the switch 44. The signal (AC_ON/OFF) is output to the communication interface 20 through the communication cable 24.

The output (Q) of the flip-flop circuit 64 is connected to the input (CK) of a flip-flop circuit 66. The output (Q) of the flip-flop circuit 64 is also connected to one input of an OR circuit 68 having the other input connected to the output (Q) of the flip-flop circuit 66. The output of the OR circuit 68 is connected to a terminal 74 serving as an output terminal for outputting a signal (PC POWER CONSUMPTION). The signal (PC POWER CONSUMPTION) keeps a high level state while the PC 12 requires power supply. The terminal 74 may not be connected to any other portion, but it is conveniently provided to make operations to be described later understandable.

The output (Q) of the flip-flop circuit 66 is connected to one input of an AND circuit 70 having the other input connected to the terminal 50 to which the signal (LINE_ON) is input through an inverter 60. The output of the AND circuit 70 is connected to a terminal 76 serving as an output terminal for outputting a signal (AC_SWITCH). The signal (AC_Switch) output from the terminal 76 controls switching by the switching unit 40 between power supply from the commercial power source AC and power supply from the battery 36. When the signal (AC_Switch) is at a high-level, the switching unit 40 selects the power supply from the battery 36. When the signal (AC_Switch) is at a low-level, the switching unit 40 selects the power supply from the commercial power source AC.

The configuration for outputting the signal (AC_ON/OFF) in accordance with the signal (line_on), on signal (SW-ON), and off signal (SW_OFF) corresponds to the output means of the present invention. The AND circuit 70 corresponds to the generating means of the present invention. The flip-flop circuit 66 having partial responsibility for generating a signal for selecting the power supply from the commercial power source AC or the power supply from the battery 36 in accordance with the signal (Shutdown COMP) corresponds to the detecting means of the present invention. The control circuit 48 corresponds to the backup power-source module of the present invention and the UPS 30 corresponds to the backup power-source apparatus of the present invention.

Next, functions of the embodiments will be described below. First, when the AC plug 32 of the UPS 30 is connected to the commercial power source AC, AC power is supplied to the battery charger 34 to thereby charge the battery 36. Assuming this time as t0, a high-level signal is generated by and output from the interface 46 in the AC controller 42. Thus, the signal (line_on) is input from the terminal SO as a high-level signal. Since the switch 44 does not indicate power-on or power-off at that time, neither ON signal (SW_ON) nor OFF signal (SW_OFF) is output. Therefore, the output (Q) of the flip-flop circuit 64 becomes low because the input (S) of the flip-flop circuit 64 is kept low while the reset input (R) becomes high by the signal (line_on).

The output (Q) of the flip-flop circuit 66 is also at a low level because the shutdown signal (Shutdown COMP) is not input from the communication interface 20, and the input (CK) and reset (R) of the flip-flop circuit 66 are kept low.

Therefore, every input to the OR circuit 68 and AND circuit 70 is at a low level, and their outputs are also kept low. Thus, each of the signal (AC_ON/OFF) shown in FIG. 5(A), the signal (PC POWER CONSUMPTION) shown in FIG. 5(B), and the signal (AC_Switch) shown in FIG. 5(D) is at a low level. The battery charger 34 receives AC power as long as the AC plug 32 is connected to the commercial power source AC. Therefore, charging of the battery 36 is started at time t0. However, for safety, a separate switch interlocked with the switch 44 may be provided between the AC plug 32 and battery charger 34.

In this case, the switching unit 40 is set so that the commercial power source AC can be selected in accordance with a low level signal and power can be supplied to the PC 12 by the commercial power source AC.

When power-on is indicated by depressing the switch 44 (time t1), the ON signal (SWOON) is supplied to the terminal 52 and the output (Q) of the flip-flop circuit 64 becomes high. Thus, the output (Q) of the flip-flop circuit 66 also becomes high. Therefore, a high level signal is input to the input of the OR circuit 68 to cause its output to become high. However, the output of the AND circuit 70 is kept low because one input thereof, that is, the inverter output of the signal (line_on) is at a low level. Thus, the signal (AC_ON/OFF) shown in FIG. 5(A) and the signal (PC POWER CONSUMPTION) shown in FIG. 5(B) become high, and only the signal (AC_Switch) shown in FIG. 5(D) becomes low.

In this case, an ON signal is output to the PC 12 and the system startup processing by power-on is started in the PC 12. That is, power is supplied to the PC 12 from the commercial power source AC as selected by the switching unit 40. At this point of time, the battery 36 is charged as shown in FIG. 5(C).

Then, when power-off is indicated by depressing the switch 44 (time t2), the OFF signal (SW_OFF) is supplied to the terminal 54 and the flip-flop circuit 64 is reset, causing its output (Q) to become low. However, the output (Q) of the flip-flop circuit 66 is kept at a high level. That is, its state is maintained until the shutdown signal (Shutdown COMP) is input from the PC 12. When the shutdown signal is input, the output of the OR circuit 68 becomes low while the output of the AND circuit 70 is kept at a low level. Thus, the signal (AC-ON/OFF) becomes low as shown in FIG. 5(A) and the signal (PC POWER CONSUMPTION) becomes high as shown in FIG. 5(B) while, as shown in FIG. 5(D), the signal (AC_Switch) is kept at a low level.

In this case, an OFF signal is output to the PC 12 and power cutoff processing is started by the system in the PC 12. When the power cutoff processing is completed in the PC 12, the PC 12 outputs a shutdown signal (Shutdown COMP), causing the output (Q) of the flip-flop circuit 66 to become low so that power supply is terminated. During the power cutoff processing, power is supplied to the PC 12 from the commercial power source AC as selected by the switching unit 40 without switching to power supply from the battery 36.

In the conventional UPS, if power supply from the commercial power source AC is cut off when power-off is indicated (time t2), discharging of the battery 36 is started and operations are continued by the power supplied from the battery 36 until the power cutoff processing is completed, as shown in FIG. 5(C). Therefore, discharging and charging of the battery 36 are repeated by switching on and off, causing the lifetime of the battery 36 to be shortened.

In the present embodiment, however, operations are continued by the power supplied from the commercial power source AC until the power cutoff processing is completed, without switching to power supply from the battery 36. Therefore, charging is continued without discharging so that the lifetime of the battery is prolonged (see FIG. 5(E)). A time period till the completion of the power cutoff processing corresponds to a time period during which the electrified state is maintained till shifting to the power cutoff state in the present invention. That is, a time period T (FIG. 5) from the time when the OFF signal is output to the PC until the power cutoff processing is completed (until the PC 12 outputs a shutdown signal) corresponds to the electrified state up to shifting to the cutoff state in the present invention. Particularly, the time period T is a transition time of the cutoff state.

Similarly, when power-on is indicated by depressing the switch 44 (time t3), an ON signal is output to the PC 12, the system startup processing after power-on is started in the PC 12, and the battery 36 is charged. Then, when power-off is indicated by depressing the switch 44 (time t4), an OFF signal is output to the PC 12, the power-cutoff processing is started by the system in the PC 12, and power is supplied to the PC 12 from the commercial power source AC as selected by the switching unit 40 without switching to power supply from the battery 36.

Next, a case is described in which power supply from the commercial power source AC is cut off due to a power failure. When power-on is indicated by depressing the switch 44 (time t5), an ON signal is again output to the PC 12, the system startup processing after power-on is started in the PC 12, and the battery 36 is charged. Then, when power supply from the commercial power source AC is cut off (time t6) before power-off is indicated by the switch 44, the inverter output of the signal (line_on) becomes high, causing both inputs of the AND circuit 70 and, hence, its output to become high. Thus, as shown in FIG. 5(D), the signal (AC_Switch) becomes high. Therefore, power supply to the PC 12 is switched from the commercial power source AC to the battery 36 by the switching unit 40 until the power cutoff processing started in the PC 12 is completed.

Thus, in the present embodiment, it is possible to maintain power supplied from the commercial power source AC until a shutdown signal is input from the PC 12, that is, the power cutoff processing is completed in the PC 12 so that switching to power supply from the battery 36 is not frequently done while, in the prior art, power supply after power-off indication depended on discharging of the battery 36. Thus, it is possible to greatly decrease times of charging and discharging of the battery so that the lifetime of the battery is improved.

In the above embodiments, the shutdown signal (Shutdown COMP) input from the PC 12 has been used. However, the present invention is not restricted thereto, and may maintain power supply from the commercial power source AC during a predetermined time period corresponding the time period till the completion of the power cutoff processing, by using a timer.

Figure 4:
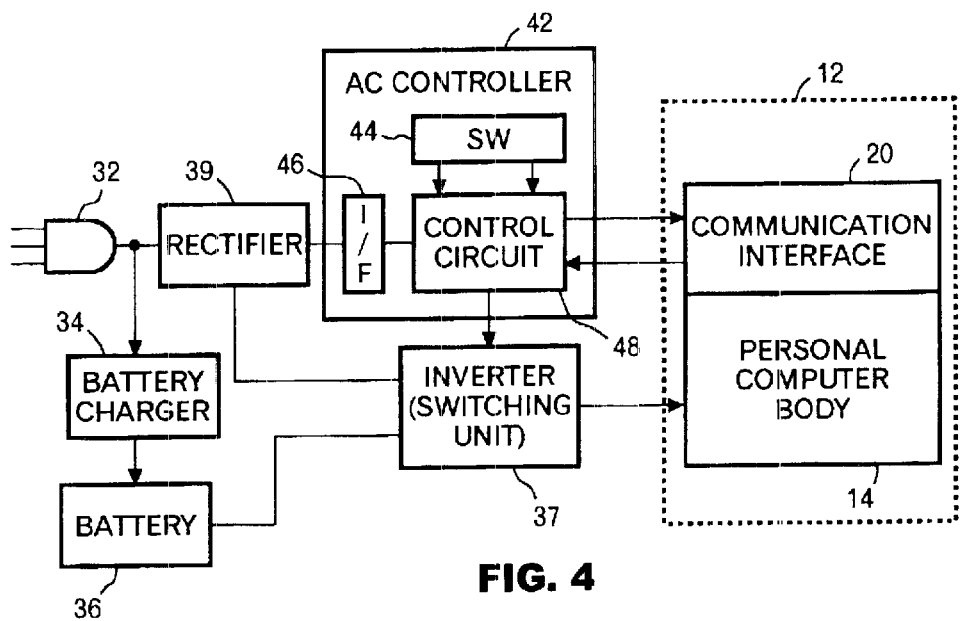
FIG. 4 is a block diagram showing another configuration of the uninterruptible power system according to the embodiment.

Further, in the above embodiments, the PC has been supplied power from the commercial power source AC, but the present invention is not restricted thereto. For example, as shown in FIG. 4, it is possible to provide a rectifier 39 and inverter 37 which is configured to have the function of the above switching unit 40 in which power from the commercial power source AC is rectified by the rectifier 39 and output to the inverter 37, and the inverter output is supplied to the PC 12. In this case, the timer for measuring the predetermined time period corresponds to the measuring means of the present invention.

Further, the present invention may also be applied to other OSs which do not output the shutdown signal though, in the above embodiments, the shutdown signal has been output from the OS. In this case, the shutdown signal may be output by an application program.

As described above, the present invention has a superior advantage that the lifetime of a battery for backing up AC input is not shortened because the present invention generates by the generating means a selection signal for selecting power supply from the battery when an electronic device is kept in an electrified state until it shifts to a power cutoff state and the AC input is kept in a no-input state.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. A backup power-source module for controlling a backup power source for supplying power from a battery to an electronic device charged by an AC input when said AC input is cut off, comprising:
   a selector that generates a selection signal for selecting power supplied by said battery when said electronic device is kept in an electrified state until said device is shifted to a power cutoff state and said AC input is kept in a no-input state, wherein said selector increases the life of said battery by causing said battery to supply power only when said electronic device is in ON state and there is no AC input.

2. The backup power-source module according to claim 1, further comprising an indicator for outputting a signal for indicating supply or cutoff of the power to said electronic device.

3. The backup power-source module according to claim 2, wherein said selector includes a detector for detecting a signal showing that said electronic device is shifted to a power cutoff state and generates said selection signal in accordance with the detection result of said detector and there is a no-input state for said AC input.

4. The backup power-source module according to claim 3, wherein said selector includes a timer for measuring a predetermined time corresponding to the shift of said electronic device to a power cutoff state and generates said selection signal in accordance with the measurement result of said timer and the no-input state of said AC input.

5. The backup power-source module according to claim 4, wherein said indicator outputs a signal showing the supply or cutoff of the power to said electronic device in accordance with an operation of a switch for indicating the supply or cutoff of the power to said electronic device.

6. The backup power-source module according to claim 5, wherein said electronic device is a computer.

7. A backup power-source apparatus, comprising:
   a backup power-source module for controlling a backup power source for supplying power from a battery to an electronic device charged by an AC input when said AC input is cut off, further comprising: a selector that generates a selection signal for selecting power supplied by said battery when said electronic device is kept in an electrified state until said device is shifted to a power cutoff state and said AC input is kept in a no-input state;
   said battery is connected to said electronic device so that power can be supplied;
   a battery charger for charging the battery in accordance with said AC input; and
   a switch for switching the power to be supplied to the electronic device between the power from said AC input and the power from said battery in accordance with said selection signal, wherein said backup power-source module increases the life of said battery by causing said battery to supply power only when said electronic device is in ON state and there is no AC input.

8. The backup power-source apparatus according to claim 7, further comprising a rectifier for rectifying the AC input to supply the power obtained by rectifying the AC input to said electronic device.

9. A computer provided with a backup power-source apparatus comprising:
   a backup power-source module for controlling a backup power source for supplying power from a battery to an electronic device charged by an AC input when said AC input is cut off, further comprising: a selector that generates a selection signal for selecting power supplied by said battery when said electronic device is kept in an electrified state until said device is shifted to a power cutoff state and said AC input is kept in a no-input state;
   said battery is connected to said electronic device so that power can be supplied;
   a battery charger for charging the battery in accordance with said AC input; and
   a switch for switching the power to be supplied to the electronic device between the power from said AC input and the power from said battery in accordance with said selection signal, wherein said backup power-source module increases the life of said battery by causing said battery to supply power only when said electronic device is in ON state and there is no AC input.

10. A backup power-source module for controlling a backup power source for supplying power from a battery to an electronic device that normally receives main power from a main source, comprising:
    a first terminal receiving a power supply state from a main source indicating that said main source is either ON or OFF;
    a second terminal receiving an ON signal indicating that a switch is in a power-on mode;
    a third terminal receiving an OFF signal indicating that said switch is in a power-off mode;
    a fourth terminal receiving a shutdown signal from an electronic device; and
    a logic control device connected to said first, second, third and fourth terminals for receiving said power supply state, said ON signal, said OFF signal, and said shutdown signal, respectively; wherein said logic control device increases the life of said battery by causing said battery to supply power only when said electronic device is in ON state and there is no AC input.

* * * * *